Figure 1:
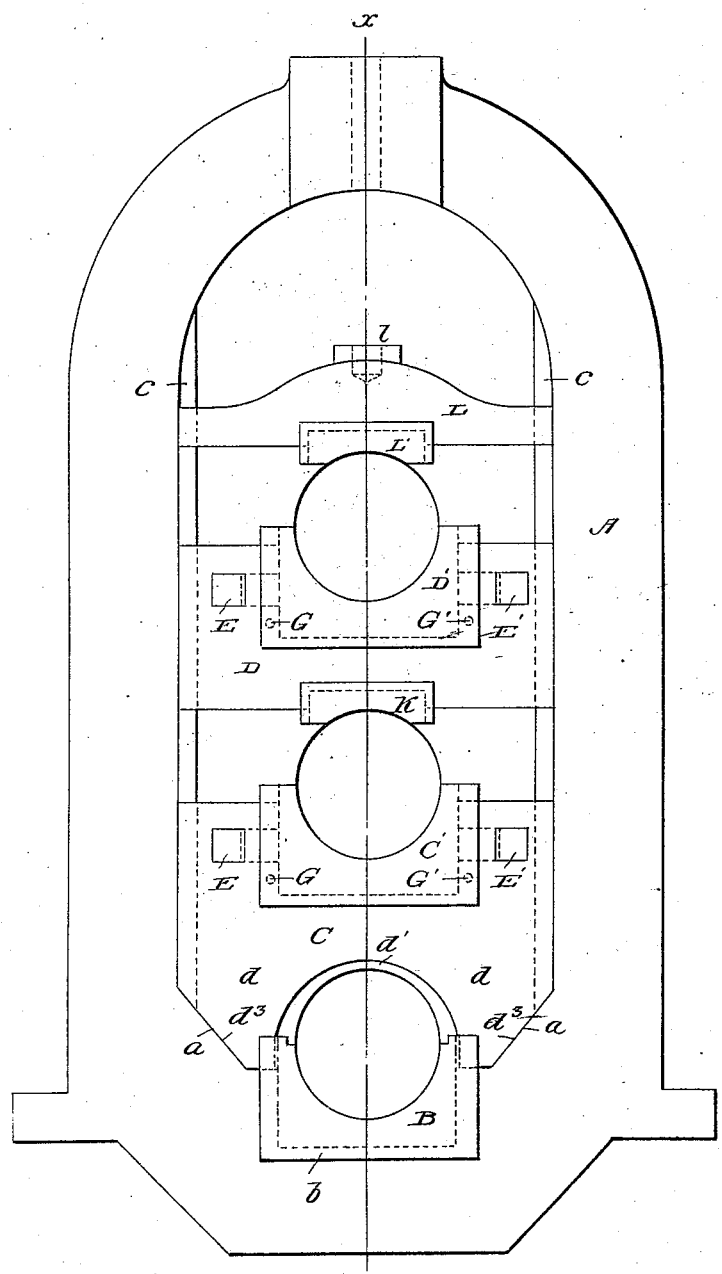

(No Model.) 2 Sheets—Sheet 1.

W. STUBBLEBINE.
HOUSING AND ROLL JOURNAL BEARING FOR SHAFTING.

No. 562,259. Patented June 16, 1896.

Witnesses:

William Stubblebine — Inventor —

By Edson Bros, Attys.

(No Model.) 2 Sheets—Sheet 2.
W. STUBBLEBINE.
HOUSING AND ROLL JOURNAL BEARING FOR SHAFTING.
No. 562,259. Patented June 16, 1896.
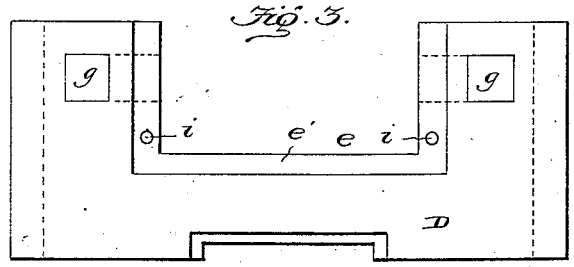
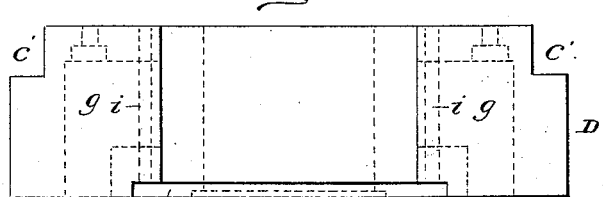
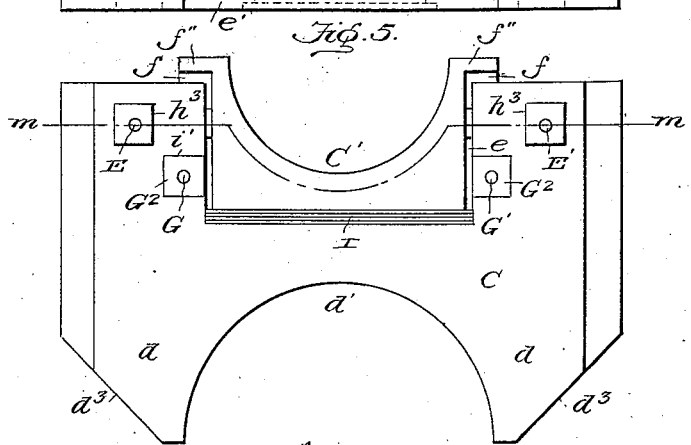
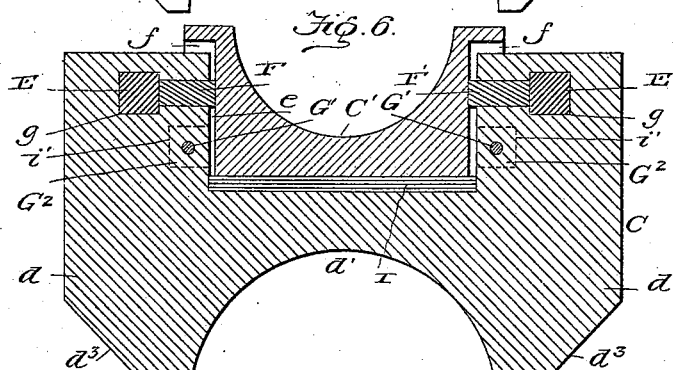
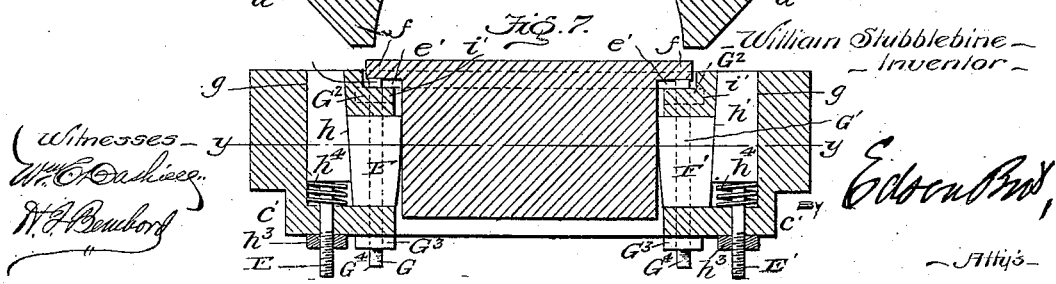
William Stubblebine —
— Inventor —
Witnesses

UNITED STATES PATENT OFFICE.

WILLIAM STUBBLEBINE, OF BETHLEHEM, PENNSYLVANIA.

HOUSING AND ROLL-JOURNAL BEARING FOR SHAFTING.

SPECIFICATION forming part of Letters Patent No. 562,259, dated June 16, 1896.

Application filed February 5, 1896. Serial No. 578,129. (No model.)

*To all whom it may concern:*

Be it known that I, WILLIAM STUBBLEBINE, a citizen of the United States, residing at Bethlehem, in the county of Northampton and State of Pennsylvania, have invented certain new and useful Improvements in Housings and Roll-Journal Bearings for Shafting; and I do hereby declare the following to be a full, clear, and exact description of the invention, such as will enable others skilled in the art to which it appertains to make and use the same.

The old and general manner of running three-high train of rolls for metal-rolling mills contemplates the use of carriages and bearings for the middle and top rolls in a manner to have the middle-roll carriage rest upon the bottom-roll journal, with the result that there is a very great amount of pressure and friction on the bottom-roll journals.

One of the improvements which I have made consists in a novel form of middle-roll bearing to be used in connection with the housing, so as to enable said carriage to rest or bear upon the housing instead of upon the bottom-roll journal, whereby the latter is relieved of the pressure and friction which is due, in the old style of bearing and housing, to the fact that the bottom roll sustains the middle-roll carriage and the middle and upper rolls.

Another improvement which I have made is in the combination of the carriage, the bearing for the roll, and liners fitted to the top of the carriage and beneath the bearing, whereby the adjustment of the bearing for different thicknesses can be more expeditiously accomplished, and effected with greater ease, than in the old way which required the removal of side keys between the carriage and housing and the use of large bars to raise the carriage, all of which required considerable time and labor.

Another improvement which I have made consists in the provision of means for adjusting the bearing within the carriage both sidewise and endwise to properly aline the bearing with the roll-journal, which adjusting means are simple, efficient, and easy of operation.

I am aware that on ordinary three-high roll-trains it is customary to have the middle roll sustained by a bearing that is held in place by heavy bolts, but this fastening device is objectionable because it requires time and labor to put the parts in place when changing the rolls.

By my improved construction, the operation of changing the rolls can be accomplished in a short time and with less labor.

My improvements can be built in with new roll-trains at about the same cost as the old devices, or they can be adapted to old roll-trains at slight expense.

Briefly stated, the improvements which I have invented tend to effect a saving of time and labor required for the adjustment and changing of the rolls, to reducing the pressure and friction on the lower roll and consequently effecting a saving in the power required to drive the rolls, and to economy in the use of grease and oil required for the lubrication of the journal-bearings; and the invention consists, furthermore, in the combination of devices, and in the construction and arrangement of parts which will be hereinafter more fully described and claimed.

To enable others to understand my invention, I have illustrated the same in the accompanying drawings, forming a part of this specification, and in which—

Figure 2:
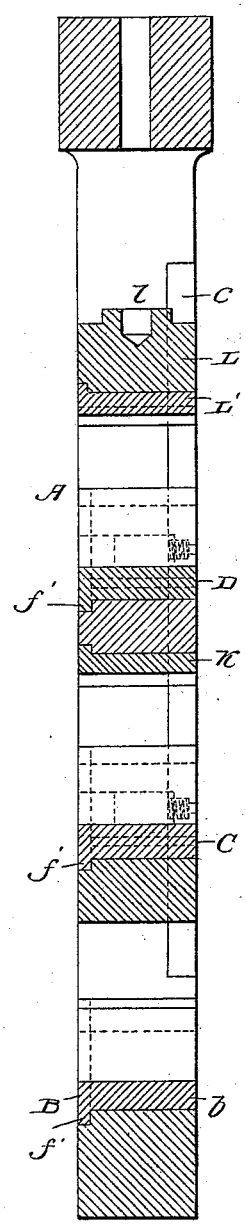

Figure 1 is an elevation of the housing and journal-bearings for rolling-mill rolls embodying my invention. Fig. 2 is a cross-sectional view of the same on the plane indicated by the dotted line $x\ x$ of Fig. 1. Figs. 3 and 4 are an elevation and plan view, respectively, of the top-roll carriage detached from the housing. Fig. 5 is a detached view, in side elevation, of the middle-roll bearing. Fig. 6 is a vertical longitudinal sectional view through the bearing of Fig. 5 on the plane indicated by the dotted line $y\ y$ of Fig. 7. Fig. 7 is a horizontal longitudinal sectional view on the plane indicated by the dotted line $m\ m$ of Fig. 5.

Like letters of reference denote corresponding parts in all the figures of the drawings.

In Figs. 1 and 2, A designates the housing of part of a metal-rolling mill for a train of three-high rolls. (Not shown.) The housing has an arched crown and a flat base, as usual. The inner opposing faces at the sides of the housing are sloped or inclined inwardly to furnish the seats $a$ for the carriage of the middle-roll bearing according to my improvement, and in the base of this housing is a rectangular opening $b$ to receive the bearing B for the lower-roll journal. On one face at the sides of the housing A are provided the vertical guide ribs or flanges $c\, c$, and the carriages C D, for the middle and top roll journal bearings or brasses C′ D′, are rabbeted or grooved on one side thereof, as at $c'$, to enable them to properly fit close up to the guide ribs or flanges $c$ of the housing.

The middle carriage C is shaped to fit between the sides of the housing, and the lower part or side of said carriage is formed to produce the legs $d\, d$ and the curved opening $d'$ between said legs $d\, d$, the lower ends of the prolonged or extended legs being beveled or inclined reversely, as at $d^3$. The carriage C is so proportioned that the opening $d'$ in the lower side thereof will receive or fit over the journal of the lower roll, but this carriage is not sustained by said lower-roll journal because the beveled extremities $d^3$ of the legs $d$ rest or bear upon the beveled seats $a$ of the housing, whereby the middle-roll carriage C is sustained by the housing and the lower roll is relieved of the pressure and friction of the middle-roll carriage and of the middle and top rolls themselves.

The carriages C D for the middle and top roll bearings are recessed or cut out at the middle to provide the recesses $e$, which accommodate the bearings C′ D′, and each carriage (C D) has its side or face opposite to the rabbet $c'$ formed with the groove or rabbet $e'$, each rabbet $e'$ extending around the margin of the recess $e$, which receives the bearing or brass for the roll-journal.

The journal bearing or brass has at the ends the vertical flanges $f$, which lie on one side or face and are continuous with the pendent flange $f'$ on the same side or face of the bearing; and these vertical flanges $f$ also join with the horizontal end flanges $f''$, the flanges $f\, f'$ being flush. The bearing or brass fits in the recess $e$ of its carriage so as to have a limited amount of play both endwise and sidewise in the carriage, and the flanges $f\, f'$ fit in the rabbet $e'$ of the carriage, while the end flanges $f''$ are adapted to rest upon the top of the carriage so as to limit the play of the bearing or brass in the carriage, all of the flanges serving to aid in positioning the bearing or brass properly within its carriage.

In connection with each carriage and bearing for the middle and top rolls, I have provided three several adjustments which are independent one from the other and which are so arranged as to tilt the bearing sidewise and endwise, or to move it vertically with relation to the carriage, whereby the bearing may be properly alined with the roll-journal and provision is made for "lining up" the roll as well as enabling the rolls to be changed, all of which adjustments can be effected with a minimum of time and labor.

The means for moving the bearing or brass endwise within the carriage contemplates the use of adjusting-bolts E E′ and tapered blocks F F′. The ends of the carriage, in the upper part thereof, are formed with chambers $g\, g$, which open into the recess $e$, and through the chambers are passed the adjusting-bolts E E′. These bolts have enlarged, inclined or cam-formed surfaces $h\, h'$ within the chambers, the cam-surface $h$ of one bolt being inclined reversely to the cam-surface $h'$ on the other bolt; and the threaded ends of said bolts protrude beyond the one side of the carriage, to receive the external adjusting-nuts $h^3$. On the threaded part of each bolt is fitted a coiled spring $h^4$, which lies within the chamber $g$ of the carriage, one end of the spring being seated against the closed side of the carriage, while the other end bears against the shoulder between the cam-formed part and threaded stem of the bolt, said spring to press the bolt to hold the adjusting-nut $h^3$ against the carriage and to hold the bolt and its cam-surface in proper position. The tapered blocks F F′ are fitted in the open sides of the chambers $g\, g$, so that one side of each block bears against one end of the journal-bearing and the other side of the block bears against the cam-surface of one of the adjusting-bolts. The blocks are placed in reverse inclined positions, so that they move the bearing or brass endwise to the proper position, and these blocks or wedges F F′ are themselves moved or adjusted by the cam-surfaces $h\, h'$ of the adjusting-bolts when the latter are moved by the nuts or springs.

The sidewise movement of the bearing or brass is effected by the adjusting-bolts G G′, which are fitted in passages $i$ in the carriage, these passages opening into the rabbet $e'$ and terminating in enlargements $i'$. In these enlargements of the bolt-passages are fitted the bearing-nuts G², which lie flush with the faces of the rabbeted portion $e'$ of the carriage, and in these bearing-nuts are screwed the ends of the bolts G G′, which ends of the bolts project through the bearing-nuts so as to impinge against the vertical flanges $f\, f$ of the journal-bearings, whereby the bolts G G′ may be turned to adjust the bearing sidewise. The opposite ends of the bolts G G′ protrude through the opposite face of the carriage, and said ends have the nuts G³, which bear against the carriage, said ends of the bolts being square, or otherwise formed, as at G⁴, to receive a wrench, or other implement, for the purpose of easily turning the bolts to adjust the bearing sidewise.

In my improved bearing the liners I for adjusting the bearing or brass are placed in the recess $e$ of the carriage and below the bearing or brass. This arrangement enables me to lift the bearing in the carriage, by the aid of comparatively small bars and with less exertion on the part of the workman, for placing the liners below the bearing or for removing them from between the carriage and bearing according as it is desired to raise or lower the roll-journal in lining up the rolls. By this combination of parts, it is only necessary to raise the roll and its bearing in the carriage, instead of lifting the carriage, bearing and roll to enable liners to be placed beneath the carriage, as heretofore.

The carriage D for the top roll is provided on its lower side with the saddle brass or bearing K to fit the top side of the journal for the middle roll, and above this top carriage is the bridge L, which is fitted to slide in the housing and which carries a saddle bearing or brass L' to bear on the top side of the journal for the top roll. This bridge is further provided with a step-bearing $l$, to receive the lower end of the usual pressure-screw. (Not shown.)

It is thought that the operation and advantages of my improvements will be readily understood by those skilled in the art from the foregoing description.

I am aware that changes in the form and proportion of parts and in the details of construction herein shown and described as the preferred embodiment of my invention can be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. The combination with a housing for a rolling-mill, of the carriage provided with a central bearing-receiving recess $e$, the bearing made of a single piece and proportioned to fit loosely within the recess $e$ and capable of a limited endwise and sidewise movement bodily within said carriage, and independent sets of adjusting devices all carried by the carriage and engaging with the single-piece bearing to hold the same firmly in the carriage and to give to said bearing the required endwise or sidewise adjustment, combined and arranged substantially as and for the purposes described.

2. In a roll-journal bearing for rolling-mills, the carriage provided with a central recess $e$, the continuous rabbet $e'$ in one of its vertical faces, and the horizontal transverse passages $g$, $i$, combined with the single-piece bearing fitted loosely within the recess $e$ to have a limited endwise and sidewise adjustment bodily within the carriage and provided on one side with the flanges which fit the rabbet $e'$ of the carriage, the horizontal wedges E, E' fitting in the passages $g$ and having adjusting means therefor, the wedges F, F' and the horizontal adjusting-bolts G', G', fitting the passages $i$ and engaging with the flange of the bearing to adjust the same sidewise, as and for the purposes described.

3. In a roll-bearing for rolling-mills, the combination of a carriage having the bearing-receiving recess $e$, the horizontal passages $i$, and the rabbet $e'$ in one of the vertical faces of said carriage, the bearing fitted in the recess $e$ and having the flange at one side adapted to the rabbet in the carriage, the fixed nuts $i'$ held in the carriage in line with the passages $i$, and the horizontal adjusting-bolts G' passing through the passages $i$ and nuts $i'$ and bearing against the flange of the bearing, combined and arranged substantially as described, and for the purposes set forth.

In testimony whereof I affix my signature in presence of two witnesses.

WILLIAM STUBBLEBINE.

Witnesses:
MICHAEL PALM,
GEO. L. BAUM.